(12) United States Patent
Onozawa et al.

(10) Patent No.: US 6,887,557 B2
(45) Date of Patent: May 3, 2005

(54) ANTI-STATIC HARD COAT FILM AND METHOD OF MANUFACTURING THE SAME

(75) Inventors: Yutaka Onozawa, Kawagoe (JP);
Satoru Shoshi, Koshigaya (JP);
Shigenobu Maruoka, Saitama (JP)

(73) Assignee: Lintec Corporation (JP)

( * ) Notice: Subject to any disclaimer, the term of this patent is extended or adjusted under 35 U.S.C. 154(b) by 18 days.

(21) Appl. No.: 10/197,475

(22) Filed: Jul. 18, 2002

(65) Prior Publication Data

US 2003/0087087 A1 May 8, 2003

(30) Foreign Application Priority Data

Jul. 27, 2001 (JP) ........................................ 2001-228387

(51) Int. Cl.[7] .......................... B32B 3/00; B32B 27/08; B32B 27/16; C08J 7/04; C08J 7/18
(52) U.S. Cl. .................... 428/195.1; 428/206; 428/208; 428/323; 428/327; 428/328; 428/335; 428/409; 428/420; 427/487; 427/508; 427/510
(58) Field of Search ................................. 428/327, 323, 428/335, 195.1, 206, 208, 328, 409, 420; 427/487, 508, 510

(56) References Cited

U.S. PATENT DOCUMENTS 6,146,753 A * 11/2000 Niimi et al. ................ 428/332
6,319,594 B1 * 11/2001 Suzuki et al. ............... 428/208

FOREIGN PATENT DOCUMENTS

| JP | 05-012713 A | * | 1/1993 |
| JP | 08-112866 A | * | 5/1996 |
| JP | 11-042729 |   | 2/1999 |

* cited by examiner

*Primary Examiner*—Monique R. Jackson
(74) *Attorney, Agent, or Firm*—Lowe Hauptman Gilman & Berner LLP

(57) ABSTRACT

An anti-static hard coat film is easy to manufacture, has a high total light transmission, achieves favorable viewability for displayed images, and has a superior balance between an anti-static effect and a resistance to scratch. A hard coat layer made of an ionizing radiation-curable resin and an anti-static layer, which is about 0.03 to 2 μm thick and is made of ionizing radiation-curable resin that includes anti-static particles with an average particle diameter of about 0.01 to 2 μm, are formed in order on a base film, and the Taber abrasion resistance is set at 25 or below as measured in accordance with JIS K5400.

12 Claims, 7 Drawing Sheets

Fig 6                *PRIOR ART*

ANTI-STATIC HARD COAT FILM AND METHOD OF MANUFACTURING THE SAME

BACKGROUND OF THE INVENTION

1. Field of the Invention

The present invention relates to an anti-static hard coat film that is used in a display, such as a liquid crystal display (hereafter "LCD") apparatus, and is both anti-static and resistant to scratch. The invention also relates to a method of manufacturing the same. In particular, the present invention relates to an optimal anti-static hard coat film for an In-Plane Switching (hereafter "IPS") LCD apparatus, and to a method of manufacturing the same.

2. Related Art

A conventional display, such as a CRT (Cathode Ray Tube) or a LCD apparatus, is provided with a hard coat film 80 in which a hard coat layer 82 with superior resistance to scratch is formed on top of a base film 84 as shown in FIG. 6A.

However, with such a hard coat film, the surface resistance of the hard coat layer itself is normally high at $1 \times 10^{13}$ $\Omega \cdot cm$ or above, so that a problem occurs in that it is easy for electrically charged dust and the like in the periphery to electrically adhere to the surface of the hard coat layer.

To reduce the surface resistivity of the hard coat layer in view of the above, as shown in FIG. 6B, an anti-static hard coat film 87 is formed by adding a preset amount of anti-static particles 86, such as antimony tin oxide (hereafter "ATO") or an aqueous polymer into a hard coat layer 88 provided on top of a base film 84 has been disclosed.

With the above anti-static hard coat film, however, the hard coat layer is relatively thick, so that in order to achieve a preset anti-static effect, large amounts of anti-static particles or aqueous polymer have to be added. As a result, a number of problems were observed for such a hard coat film, such as a significant reduction in a total light transmission and deterioration in the effectiveness of the film as a hard coat.

JP 11-42729 A discloses an anti-static hard coat film 89 formed, as shown in FIG. 6C, with an anti-static layer 88, which includes anti-static particles 86, or an anti-static layer composed of a thin metal film between a base film 84 and a hard coat layer 82.

However, since the anti-static layer is located below the relatively thick hard coat layer and so is at some distance from the surface, the value of the surface resistance is still high, making it difficult to achieve a preset anti-static effect.

Also, with the disclosed anti-static hard coat film, the anti-static layer is sandwiched between the hard coat layer and the base film, both of which are electrical insulators. This has made it difficult to earth the anti-static layer.

For the above reasons, an anti-static hard coat film with the following laminated structure has been proposed. A hard coat layer and an anti-static layer are successively formed on a base film so that the anti-static layer is present at the surface. That is to say, the formation of an anti-static layer of an ionizing radiation-curable resin that is irradiated with ionizing radiation on the hard coat film has been proposed.

However, the thickness of the anti-static layer is normally a few microns or less, so that if this layer is simply irradiated with ionizing radiation, curing defects occur due to impedance by oxygen, which is present in the air in the periphery. As a result, it has been difficult to form an anti-static layer with a preset surface resistivity and resistance to scratch.

On the other hand, a different method of manufacturing an anti-static hard coat film is disclosed by JP 8-112866 A. According to this method, as shown by FIG. 7, a UV curable resin 92 is applied onto a base member 93, with this then being laminated with an anti-static layer 91 that has been formed in advance on backing liner 94. After this, the UV curable resin 92 is cured by irradiating, via the anti-static layer 91, the UV curable resin 92 with UV rays 96, either after the backing liner 94 has been peeled off the anti-static layer 91 side or alternatively with the backing liner 94 still in place. As shown in FIG. 7, this process can be carried out with the assistance of rolls 95.

However, even when backing liner has been used, it has not been easy to evenly laminate the anti-static layer and the applied UV curable resin with even thicknesses and without creases. As one example, it was observed that when the anti-static layer is a thin film with a thickness of 5 $\mu$m or below or when the anti-static layer has a width of 10 cm or above, the laminar pressure of the anti-static layer and the applied UV curable resin becomes uneven, making it effectively impossible to laminate the resin and the anti-static layer.

It has also been observed that when UV curable resin is exposed to light to cure the resin, the resin contracts significantly as it cures, which makes it even more difficult to laminate the anti-static layer and the hard coat-layer composed of the UV curable resin. Accordingly, even if the anti-static layer and the applied UV curable resin are aligned before the resin is cured, it has not been easy to laminate the layer and the resin at preset positions once the resin has cured.

There has been a further problem with the disclosed method in that since the anti-static layer is formed by being cured in advance, it is difficult to cause reactions at the interface between the anti-static layer and the hard coat layer. Consequently, there is a reduction in the adhesion of the anti-static layer and the hard coat layer, which has led to various problems being observed, such as the anti-static layer peeling off or a preset resistance to scratch not being achieved.

Also, with the disclosed method, the anti-static layer needs to be produced using a separate process, which has disadvantages such as an increase in the number of manufacturing processes, an increase in the manufacturing time, and the need to use backing liner.

SUMMARY OF THE INVENTION

The inventors of the present invention thought long and cure about the problems described above and came up with the present invention. In the present invention, both the anti-static layer and the hard coat layer are composed of an ionizing radiation-curable resin. By restricting the values of the thickness of the anti-static layer, the average particle diameter of the anti-static particles included in the anti-static layer, and the Taber abrasion resistance of the hard coat film as measured in accordance with the JIS (Japanese Industrial Standards) K5400 to values within preset ranges, a superior total light transmission can be maintained while achieving a preset anti-static effect (surface resistivity) and resistance to scratch.

In other words, it is a first object of the present invention to provide an anti-static hard coat film that can be easily manufactured and, when used in a display device, has a superior total light transmission, an anti-static effect, and resistance to scratch.

A second object of the present invention is to provide a method of manufacturing whereby an anti-static hard coat film that has a superior total light transmission, an anti-static effect, and resistance to scratch can be efficiently produced.

The present invention achieves the first object by providing an anti-static hard coat film, including: a base film; a hard coat layer made of an ionizing radiation-curable resin; and an anti-static layer, which is about 0.03 to 2 μm thick and is made of an ionizing radiation-curable resin that includes anti-static particles with an average particle diameter of about 0.01 to 2 μm, the hard coat layer and the anti-static layer being formed in order on the base film, and the anti-static hard coat film having a Taber abrasion resistance of 25 or below as measured in accordance with JIS K5400.

With the above structure, the action of the anti-static particles included in the anti-static layer provided on the hard coat layer makes it possible to achieve a preset anti-static effect.

Also, when the above film is used on an LCD apparatus or the like, an anti-static hard coat film with a superior total light transmission and a superior resistance to scratch can be easily provided.

When forming an anti-static hard coat film according to the present invention, it is preferable for the thickness of the anti-static layer to be substantially equal to the average particle diameter of the anti-static particles.

With the thickness is substantially equal to the average particle diameter in this way, the anti-static particles in the anti-static layer exist in what is essentially a single layer, so that the absorption of light by the anti-static particles can be reduced.

Furthermore, it becomes easy for adjacent anti-static particles to come into contact with each other, so that a preset surface resistivity (also referred to as simply "surface resistance" in this specification) can be achieved by adding a relatively small amount of anti-static particles.

Accordingly, even better a total light transmission and anti-static characteristics can be obtained for an anti-static hard coat film.

When forming an anti-static hard coat film according to the present invention, it is also preferable for an added amount of the anti-static particles to fall in a range of about 50 to 90% by weight relative to a total weight of the anti-static layer.

When the above amount is used, a preset surface resistivity can be reliably obtained, while on the other hand the total light transmission can be controlled so as to be a preset value or higher.

When forming an anti-static hard coat film according to the present invention, it is also preferable for the anti-static layer to be formed in a pattern.

When the anti-static layer is formed in a pattern, there is a reduction in the area of the anti-static layer relative to the total area of the anti-static hard coat film, so that the absorption of light by the anti-static layer is reduced, and better a total light transmission can be achieved. Since an increase can be made in the added amount of anti-static particles corresponding to the reduction in the area of the anti-static layer, it is possible to reliably achieve a preset surface resistance.

Accordingly, even better a total light transmission and anti-static characteristics can be obtained for an anti-static hard coat film.

When forming an anti-static hard coat film according to the present invention, it is also preferable for the ionizing radiation-curable resin in the hard coat layer and the ionizing radiation-curable resin in the anti-static layer to react at an interface between the hard coat layer and the anti-static layer.

When the ionizing radiation-curable resin in the two layers reacts, the adhesion between the hard coat layer and the anti-static layer can be increased, and the mechanical constraining force that acts on the anti-static layer due to the hard coat layer can be increased.

Accordingly, the mechanical strength and the resistance to scratch of the hard coat layer can be further improved, and the anti-static layer can be made thinner.

When forming an anti-static hard coat film according to the present invention, it is also preferable for the hard coat layer to be an anti-glare hard coat layer.

When the hard coat layer is an anti-glare hard coat layer, the anti-static hard coat film can be provided with an anti-glare property so that the effect of peripheral light can be effectively suppressed.

When forming an anti-static hard coat film according to the present invention, it is also preferable for the anti-static hard coat film to be used on the surface of an IPS liquid crystal display apparatus.

Due to its construction, an IPS LCD apparatus is sensitive to static electricity and requires an anti-static effect (conductivity) of around $1 \times 10^8$ Ω·cm. When the above anti-static hard coat film is used on the surface of an IPS LCD apparatus, the effects of static electricity on the IPS LCD apparatus can be eradicated. Accordingly, when the IPS LCD apparatus is driven, driving can be performed properly by applying a voltage in the horizontal direction.

Another embodiment of the present invention is a method of manufacturing an anti-static hard coat film, including: a first step of forming a hard coat layer, composed of an ionizing radiation-curable resin, on a base film by irradiating the ionizing radiation-curable resin with ionizing radiation; and a second step of forming an anti-static layer, which is about 0.03 to 2 μm thick and is made of an ionizing radiation-curable resin that includes anti-static particles with an average particle diameter of about 0.01 to 2 μm, on top of the hard coat layer and setting a Taber abrasion resistance of the anti-static hard coat film at about 25 or below as measured in accordance with JIS K5400.

When the above method is used, an anti-static layer that has a preset resistance to scratch can be properly and easily laminated on a hard coat layer. Accordingly, a preset anti-static effect can be reliably obtained due to the effect of the anti-static particles that are included in the anti-static layer. Since ionizing radiation is used, when the anti-static hard coat film is used in a display device, an anti-static hard coat film that has superior total light transmission and resistance to scratch can be quickly and easily provided.

When using the manufacturing method for an anti-static hard coat film according to the present invention, it is preferable that during the first step, the hard coat layer is formed in a semi-cured state by irradiation with ionizing radiation, and during the second step, the anti-static layer is cured by irradiation with ionizing radiation and the hard coat layer is also further cured.

When the above method is used, the ionizing radiation-curable resin in the hard coat layer and the ionizing radiation-curable resin in the anti-static layer can be made to react at the interface between the hard coat layer and the anti-static layer. As a result, the mechanical strength of the anti-static layer can be further improved, and a preset resistance to scratch can be effectively achieved.

Also, when the above method is used, even if oxygen in the periphery impedes the reaction when the anti-static layer is cured, the anti-static layer can still be sufficiently cured by making effective use of an initiator that remains in the hard coat layer.

When using the manufacturing method for an anti-static hard coat film according to the present invention, it is preferable that an amount of ionizing radiation used in the first step is set at below about 100 mJ/cm$^2$ and an amount of ionizing radiation used in the second step is set at about 500 mJ/cm$^2$ or above.

When the above amounts of radiation are used, during the first process a semi-cured state can be easily produced without effectively causing any surface tack. Accordingly, since the hard coat layer is not in the form of a liquid resin, the anti-static layer can be easily and reliably formed on the hard coat layer with an even thickness.

Also, since the hard coat layer has been partially cured, in the following second step, the amount of irradiation mentioned above is used to promote the curing reaction, so that both the anti-static layer and the hard coat layer can be sufficiently hardened and the curing shrinkage that occurs in the hard coat layer can be reduced.

When using the manufacturing method for an anti-static hard coat film according to the present invention, it is preferable that at least the second step is performed in a nitrogen atmosphere.

When the method is performed in this way, oxygen can be effectively prevented from impeding the curing of the anti-static layer achieved through the irradiation of ionizing radiation.

When using the manufacturing method for an anti-static hard coat film according to the present invention, it is preferable that during the second step, irradiation by the ionizing radiation is performed in a pattern.

When the method is performed in this way, an anti-static layer that is formed in a pattern and has a reduced area can be easily obtained. As a result, an anti-static hard coat film with an even better a total light transmission can be obtained.

DETAILED DESCRIPTION OF THE PREFERRED EMBODIMENTS

First Embodiment

Figure 1:
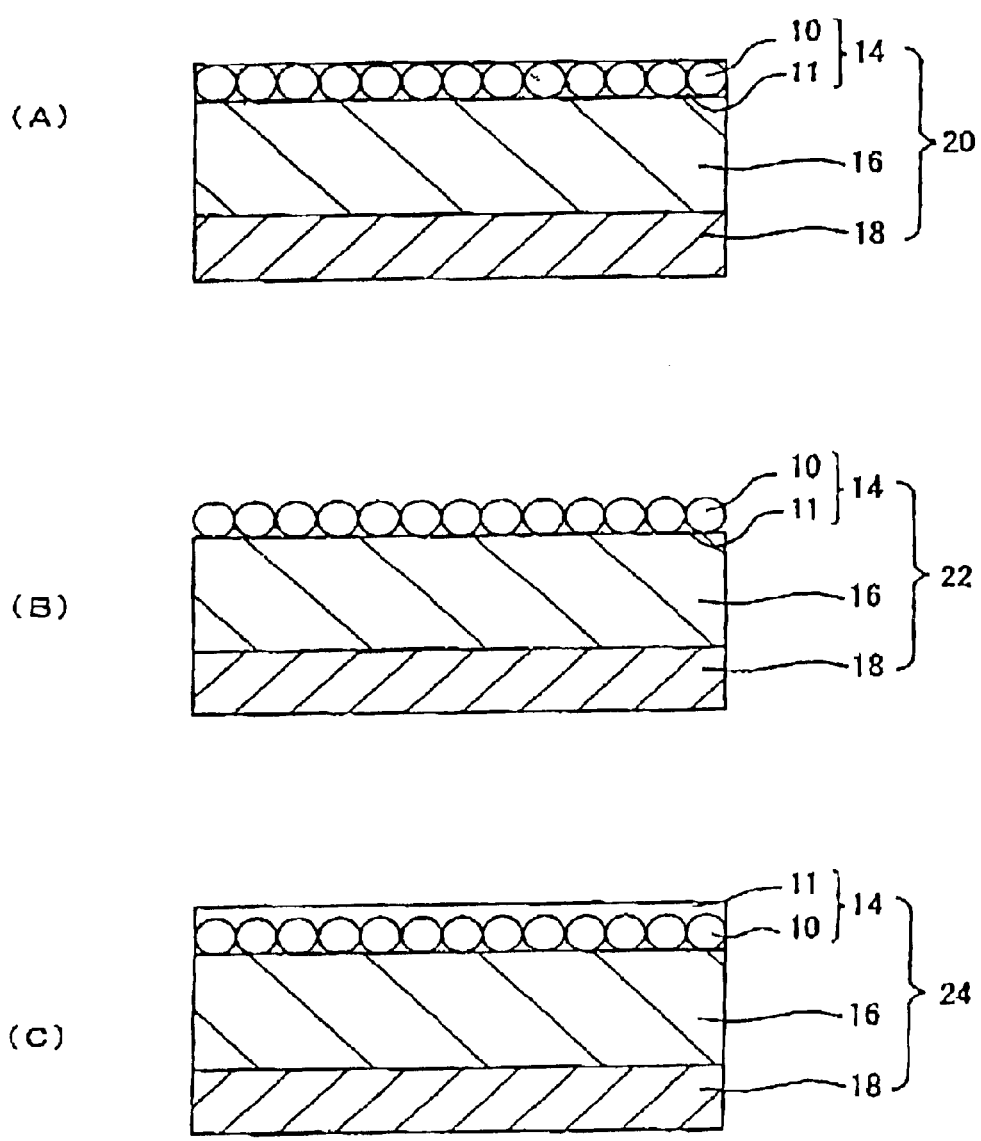
FIG. 1A to FIG. 1C are sectional views of anti-static hard coat films according to the present invention.

The first embodiment of the present invention is an anti-static hard coat film 20 with the following structure. As shown in FIG. 1A, the anti-static hard coat film 20 has (A) a hard coat layer 16 composed of an ionizing radiation-curable resin, and (B) an anti-static layer 14 that has a thickness of about 0.03 to 2 μm and is formed of an ionizing radiation-curable resin 11 including anti-static particles 10 with an average particle diameter of about 0.01 to 2 μm formed in order on a base film 18. This anti-static hard coat film 20 has a Taber abrasion resistance of 25 or below as measured in accordance with JIS K5400.

The following describes, with reference to the attached drawings, the structure of the present anti-static hard coat film 20 in detail, focusing on the different structural conditions one at a time.

1. Base Film

The base film 18 of the anti-static hard coat film 20 may be formed of any of the following examples of transparent resin films: polyethylene terephthalate (PET), polycarbonate (PC), polyethylene naphthalate (PEN), polyethylene (PE), polypropylene (PP), polyvinyl chloride (PVC), polymethyl methacrylate (PMMA), polysulfone (PSU), polyacrylonitrile (PAN), and triacetylcellulose (TAC).

Out of the above base films, it is preferable to use a transparent resin film made of polyethylene terephthalate and/or polycarbonate since these materials can be put to a wide variety of uses and have superior transparence and mechanical strength.

It is also preferable for the thickness of the base film 18 to be in a range of about 6 to 500 μm.

When the thickness of the base film 18 is below 6 μm, there are cases where there is a significant fall in the mechanical strength of the base film 18. On the other hand, when the thickness of the base film 18 is above 500 μm, there are cases where there is a fall in the light transmittance so that displayed images are not sufficiently viewable.

Accordingly, for a more favorable balance between mechanical strength and light transmittance, it is more preferable for the thickness of the base film 18 to be in a range of about 20 to 250 μm.

It is also preferable for a primer layer (not shown) to be provided on the surface of the base film 18.

By providing a primer layer, the strength of the adherence between the base film 18 and the cured ionizing radiation-curable resin that forms the hard coat layer 16 can be improved, and the resistance to scratch achieved by the hard coat layer 16 and also the anti-static layer 14 can be further improved.

As examples, one or a combination of two or more of a urethane resin, an acrylic resin, an epoxy resin, a polyester resin, a silicone resin, etc., may be used as the material for forming the primer layer.

Furthermore, the thickness of the primer layer should preferably be in a range of about 1 to 20 μm. When the thickness of the primer layer is below 1 μm, there are cases where the primer effect is not achieved. On the other hand, when the thickness of the primer layer is above 20 μm, there are cases where the viewability of displayed images decreases once the anti-static hard coat film has been formed.

Accordingly, for a more favorable balance between the primer effect and the viewability of displayed images, it is more preferable for the thickness of the primer layer to be in a range of 3 to 15 μm.

It is also preferable for fine concaves and convexes, such as 0.1 to 5 μm concaves and convexes, to be provided in the surface of the base film 18. That is to say, in order to improve the adherence of the base film 18 and the hard coat layer 16 and to make use of the anti-glare effect of the base film 18, it is preferable to perform a surface treatment that provides fine concaves and convexes in the base film 18.

Two examples of methods for performing this surface treatment that provides fine concaves and convexes are a sandblasting method and a solvent treatment method that are performed on the base film 18. Alternatively, an oxidizing treatment, such as a corona treatment, a chromic acid treatment, a flame treatment, a hot blast treatment, or an ozone/ultraviolet irradiation treatment, may be used.

The rear surface of the base film 18 should be preferably provided with a layer of an adhesive agent (not shown). When a layer of an adhesive agent is provided, it becomes possible to stick the anti-static hard coat film 20 onto any desired surface, such as the window of a building or a vehicle, or any other surface for which resistance to scratch, resistance to wear, and an anti-static effect are required.

Here, examples of the adhesive agents that may be used include a natural rubber, a synthetic rubber, an acrylic resin, a polyvinyl ether resin, a urethane resin, and a silicone resin.

The adhesive agent may also be combined as required with a tackifier, a filler, a softener, an antioxidant, a UV absorbing agent, a cross-linking agent, or the like.

It should be noted that the thickness of the adhesive agent should preferably be a value that normally falls in a range of about 5 to 100 $\mu$m, with a value that falls in a range of about 10 to 50 $\mu$m being even more preferable.

2. Hard Coat Layer
(1) Ionizing Radiation-Curable Resin
(i) Main Component

There are no special restrictions over the type of the main component for the ionizing radiation-curable resin (also referred to in this specification as a "radiation-curable transparent resin") that composes the hard coat layer, so that the main component can be selected from a number of conventionally known materials. As examples, one or a combination of two or more of a 1,4-butandiol di(meth)acrylate, a 1,6-hexanediol di(meth)acrylate, a neopentyl glycol di(meth)acrylate, a polyethylene glycol di(meth)acrylate, a neopentyl glycol adipate di(meth)acrylate, a hydroxyl neopentyl pivalate glycol di(meth)acrylate, a dicyclopentanyl di(meth)acrylate, a caprolactone-modified dicyclopentanyl di(meth)acrylate, an EO-modified phosphate di(meth)acrylate, an aryl cyclohexyl di(meth)acrylate, an isocyanate di(meth)acrylate, a trimethylolpropane tri(meth)acrylate, a dipentaerythritol tri(meth)acrylate, a pentaerythritol tri(meth) acrylate, a PO-modified trimethylolpropane tri(meth)acrylate, a tris(acryloxyethyl) isocyanate, a dipentaerythritol penta(meth)acrylate, a dipentaerythritol hexa(meth)acrylate, a caprolactone-modified dipentaerythritol hexa(meth) acrylate, a urethane acrylate, an epoxy acrylate, a polyester acrylate, and a polyol acrylate, etc., may be used.

(ii) Curing Agent

The following are examples of substances that may be used as the curing agent (curing catalyst): benzoin; a benzoin methyl ether; a benzoin ethyl ether; a benzoin isopropyl ether; a benzoin-n-butyl ether; a benzoin isobutyl ether; an acetophenone; a dimethylamino acetophenone; 2,2-dimethoxy-2-phenylacetophenone; 2,2-diethoxy-2-phenylacetophenone; 2-hydroxy-2-methyl-1-phenylpropane-1-on; 1-hydroxycyclohexyl phenyl ketone; 2-methyl-1-[4-(methylthio) phenyl]-2-morpholino-propane-1-on; 4-(2-hydroxyethoxy) phenyl-2(hydroxy-2-propyl) ketone; benzophenone; p-phenyl benzophenone; 4,4'-diethylamino benzophenone; dichlorobenzophenone; 2-methyl anthraquinone; 2-ethylanthraquinone; 2-tertiary-butyl anthraquinone; 2-aminoanthraquinone; 2-methylthio xanthone; 2-ethylthio xanthone; 2-chlorothio xanthone; 2,4-dimethyl thio xanthone; 2,4-diethyl thio xanthone; benzil dimethyl ketal; acetophenone dimethyl ketal; and p-dimethylamine benzoic ester.

One of the above substances may be used alone, or alternatively a combination of two or more of the substances may be used.

It is preferable to use an oligomer-type curing agent with a number-average molecular weight (Mn), as measured by gel permeation chromatography (GPC), in a range of 500 to around 1000 as a curing agent that suffers little decomposition and deterioration, even when heated during the evaporation of a solvent.

The following are specific examples of oligomer-type curing agents:

poly[2-hydroxy-2-methyl-1-[4-(1-methylvinyl)phenyl] propanone];

poly[2-hydroxy-2-methyl-1-[4-(1-vinyl-phenyl)] propanone];

poly[2-hydroxy-2-ethyl-1-[4-(1-methylvinyl)phenyl] propanone];

poly[2-hydroxy-2-ethyl-1-[4-vinyl-phenyl]propanone];

poly[2-hydroxy-2-methyl-1-[4-(1-methylvinyl)phenyl] butanone];

poly[2-hydroxy-2-methyl-1-[4-(1-methyl-phenyl)] butanone];

poly[2-hydroxy-2-ethyl-1-[4-(1-methylvinyl)phenyl] butanone];

poly[2-hydroxy-2-ethyl-1-[4-vinyl-phenyl]butanone], etc.

When preparing the hard coat material, it is preferable to set the added amount of the curing agent (component B) in a range of about 0.5 to 30 parts by weight relative to 100 parts by weight of the ionizing radiation-curable resin main component (component A).

When the added amount of curing agent (component B) is below about 0.5 parts by weight, there are cases where the ionizing radiation-curable resin cannot be sufficiently cured. On the other hand, when the added amount of curing agent (component B) is above about 30 parts by weight, there are cases where it becomes difficult to control the curing of the ionizing radiation-curable resin and there is deterioration in the storage stability of the resin.

Accordingly, it is more preferable to set the added amount of the curing agent (component B) in a range of about 1 to 20 parts by weight relative to 100 parts by weight of the ionizing radiation-curable resin main component (component A).

(2) Thickness

It is preferable for the thickness of the hard coat layer to be set in a range of about 2 to 20 $\mu$m.

When the thickness of the hard coat layer is below about 2 $\mu$m, there are cases where the Taber abrasion resistance becomes very high.

On the other hand, when the thickness of the hard coat layer is above about 20 $\mu$m, there are cases where a large degree of curling occurs.

Accordingly, in view of the Taber abrasion resistance and the incidence of curling, it is more preferable to set the thickness of the hard coat layer at a value that falls in a range of 5 to 15 $\mu$m.

(3) Filler

To improve the anti-glare property and resistance to scratch of the hard coat layer, it is also preferable to include a variety of filler materials in the ionizing radiation-curable resin that composes the hard coat layer.

As examples, one or a combination of two or more of silica particles, polyester particles, polystyrene particles, acrylic resin particles, etc. may be preferably used as a filler.

3. Anti-Static Layer

(1) Ionizing Radiation-Curable Resin

It is preferable to use the same ionizing radiation-curable resin that was used in the hard coat layer as the ionizing radiation-curable resin that composes the anti-static layer.

When the same resin is used, the adhesive force between the anti-static layer and the hard coat layer is improved, so that as a result, a superior resistance to scratch can also be achieved for the anti-static layer.

(2) Anti-Static Particles

(i) Types

As examples of the types of anti-static particles (conductive particles), any one or combination of two or more of the following substances may be used: tin-doped indium oxide; antimony-doped tin oxide; tin oxide; zinc antimonate, antimony pentoxide, etc.

Out of the above substances, it is more preferable to use tin oxide or tin-doped indium oxide, since these substances mix and disperse more evenly in the ionizing radiation-curable resin.

(ii) Average Particle Diameter

It is also preferable for the average particle diameter of the anti-static particles to be set at a value that falls in a range of about 0.01 to 2 $\mu$m.

When the average particle diameter of the anti-static particles is below about 0.01 $\mu$m, there are cases where many particles are overlapping, so that there is a significant drop in a total light transmission. There are also cases where the electrical resistance between adjacent anti-static particles becomes high, resulting in the surface resistivity becoming high.

On the other hand, when the average particle diameter of the anti-static particles is above about 2 $\mu$m, the particles are likely to settle so that there can be difficulties during handling. There are also cases where there is a drop in surface smoothness.

Accordingly, to achieve a more favorable balance between the handling characteristics and the total light transmission, it is more preferable for the average particle diameter of the anti-static particles to be in a range of about 0.05 to 1 $\mu$m, with a value in a range of about 0.1 to 0.5 $\mu$m being even more preferable.

(iii) Added Amount

It is also preferable for the added amount of the anti-static particles to be a value that falls in a range of about 50 to 90% by weight relative to the total weight of the anti-static layer.

When the added amount of anti-static particles is below 50% by weight, there are cases where the electrical resistance between adjacent anti-static particles becomes high, resulting in surface resistivity becoming high.

On the other hand, when the added amount of anti-static particles is above 90% by weight, there are cases where many anti-static particles are overlapping, so that there is a significant drop in a total light transmission.

Accordingly, in order to achieve a more favorable balance between the surface resistivity and the total light transmission, it is more preferable for the added amount of anti-static particles to be set in a range of about 55 to 85% by weight relative to the total weight of the anti-static layer, with a value in a range of about 60 to 80% by weight being even more preferable.

(iv) Powder Resistivity

It is also preferable for the powder resistivity (volume resistivity) of the anti-static particles to be set at a value of about 1,000 $\Omega$·cm or below.

When the powder resistance of the anti-static particles is above 1,000 $\Omega$·cm, the electrical resistance between adjacent particles is high, so that there can be cases where the surface resistivity increases or where a large amount of particles have to be added to obtain a preset surface resistivity, which results in a drop in the total light transmission.

(3) Thickness

The present invention is characterized by the thickness of the anti-static layer being set in a range of about 0.03 to 2 $\mu$m.

When the thickness of the anti-static layer is below about 0.03 $\mu$m, the Taber abrasion resistance becomes extremely high or the surface resistivity becomes high. Also, when the thickness of the anti-static layer is below 0.03 $\mu$m, there are also cases where the Haze value becomes high.

On the other hand, when the thickness of the anti-static layer is above about 2 $\mu$m, there are cases where settling becomes likely to occur for the anti-static particles and where there is a drop in the surface smoothness.

Accordingly, in view of the Taber abrasion resistance and the value of the surface resistivity, it is more preferable for the thickness of the anti-static layer to be a value that falls in a range of about 0.03 to 1 $\mu$m.

The following describes, with reference to FIGS. 1A to 1C, the relationship between (i) the thickness of the anti-static layer 14 and (ii) the anti-static particles 10 and the ionizing radiation-curable resin 11 in the anti-static layer 14.

In FIG. 1A, an anti-static hard coat film 20 is shown that has a thickness of anti-static layer 14 that is effectively equal to the average particle diameter of the anti-static particles 10, and the thickness of the ionizing radiation-curable resin 11 is also approximately equal to the average particle diameter of the anti-static particles 10.

As a result, the anti-static particles 10 are arranged in what is effectively a single layer, so that while adjacent anti-static particles come into electrical contact in the lateral direction, there is a reduction in the number of particles that are overlapping in the perpendicular direction. This is to say, where there is a reduction in the absorption of light by the anti-static layer, the total light transmission is increased, and the surface resistivity falls. Also, a suitable amount of ionizing radiation-curable resin is present around the anti-static particles and a sufficient bond can be achieved with the hard coat layer below the anti-static layer, so that a superior resistance to scratch is achieved and at the same time there is a significant fall in the value of the Taber abrasion resistance.

In FIG. 1B an anti-static hard coat film 22 is shown that has an anti-static layer 14 that has been made comparatively thin, and shows the case where the thickness of the ionizing radiation-curable resin 11 is less than the average particle diameter of the anti-static particles 10.

In this case also, the anti-static particles are effectively arranged in a single layer, with adjacent anti-static particles being in electrical contact with one another in the lateral direction, so that acceptable values are obtained for the surface resistivity and the total light transmission.

FIG. 1C an anti-static hard coat film 24 is shown that has an anti-static layer 14 that has been made comparatively thick, and shows the case where the thickness of the ionizing radiation-curable resin 11 is larger than the average particle diameter of the anti-static particles 10.

Accordingly, some anti-static particles can be overlapping in the perpendicular direction, so that there may be a slight reduction in the total light transmission and in the surface resistivity. On the other hand, there is an increase in the amount of ionizing radiation-curable resin that surrounds the anti-static particles, making it easy to firmly fix the antistatic particles and to adhere the anti-static layer 14 to the hard coat layer 16 below. As a result, a superior resistance to scratch can be achieved, with there also being a significant drop in the value of the Taber abrasion resistance.

(4) Arrangement

It is also preferable for an anti-static layer to be laminated above and below the hard coat layer so as to sandwich the hard coat layer.

When the above structure is used, an even more superior anti-static effect can be achieved by having the anti-static layers above and below the hard coat layer conduct electricity via electrical connecting members (including a ground connection).

It should be noted that as mentioned above, the anti-static layer disposed at the bottom can have the same composition as the anti-static layer is disposed at the top, or alternatively can have a different composition to the anti-static layer disposed at the top.

(5) Pattern

Figure 2:
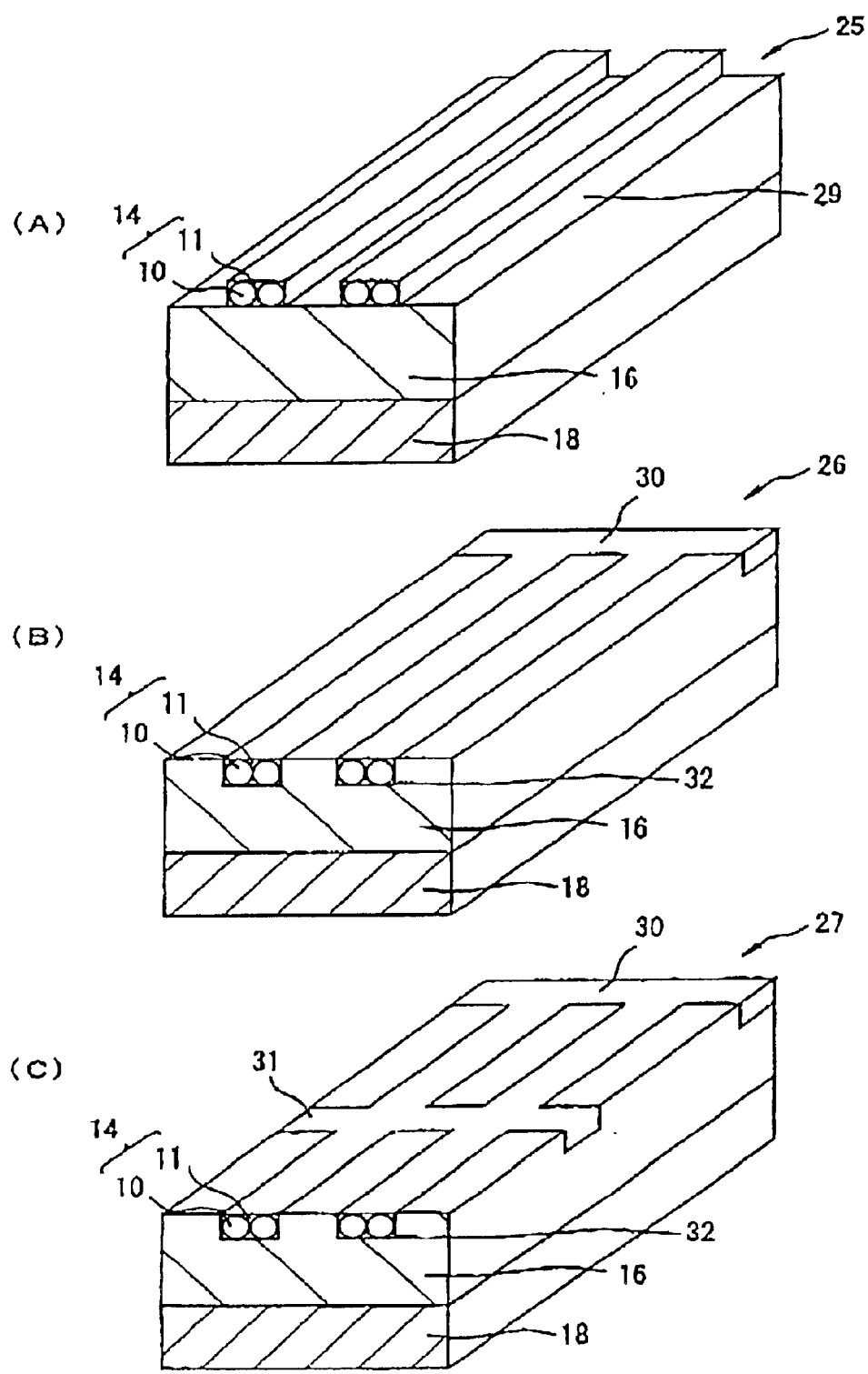
FIG. 2A to FIG. 2C are perspective sectional views of anti-static hard coat films according to the present invention.

As shown in FIGS. 2A to 2C, it is also preferable for the anti-static layer 14 to be formed in a pattern.

FIG. 2A shows an example of an anti-static hard coat film 25 that has an anti-static layer 14 that has been formed on a surface 29 of the hard coat layer 16 in a striped pattern. FIG. 2B shows an example of an anti-static hard coat film 26 that has an anti-static layer 14 that has been formed on the hard coat layer 16 in a striped pattern with part or all of the anti-static layer 14 being buried 32 in the hard coat layer 16 so as to create a smooth surface. The example shown in FIG. 2B has a common electrode 30 for supplying electricity to each stripe in the anti-static layer 14 provided at the ends of the stripes so as to lower the surface resistivity of the anti-static layer 14. FIG. 2C shows an example of an anti-static hard coat film 27 that has an anti-static layer 14 formed in a striped pattern and another anti-static layer 31 formed in a perpendicular striped-pattern, resulting in the overall form of a lattice. Both the antistatic layers 14 and 31 are shown to be buried 32 in the hard coat 16.

By forming the anti-static layer 14 in a pattern as described above, the surface area of the anti-static layer 14 can be reduced while maintaining a superior surface resistance. In accordance with this reduction in the surface area of the anti-static layer 14, a significant increase can be made in the value of the total light transmission.

Figure 3:
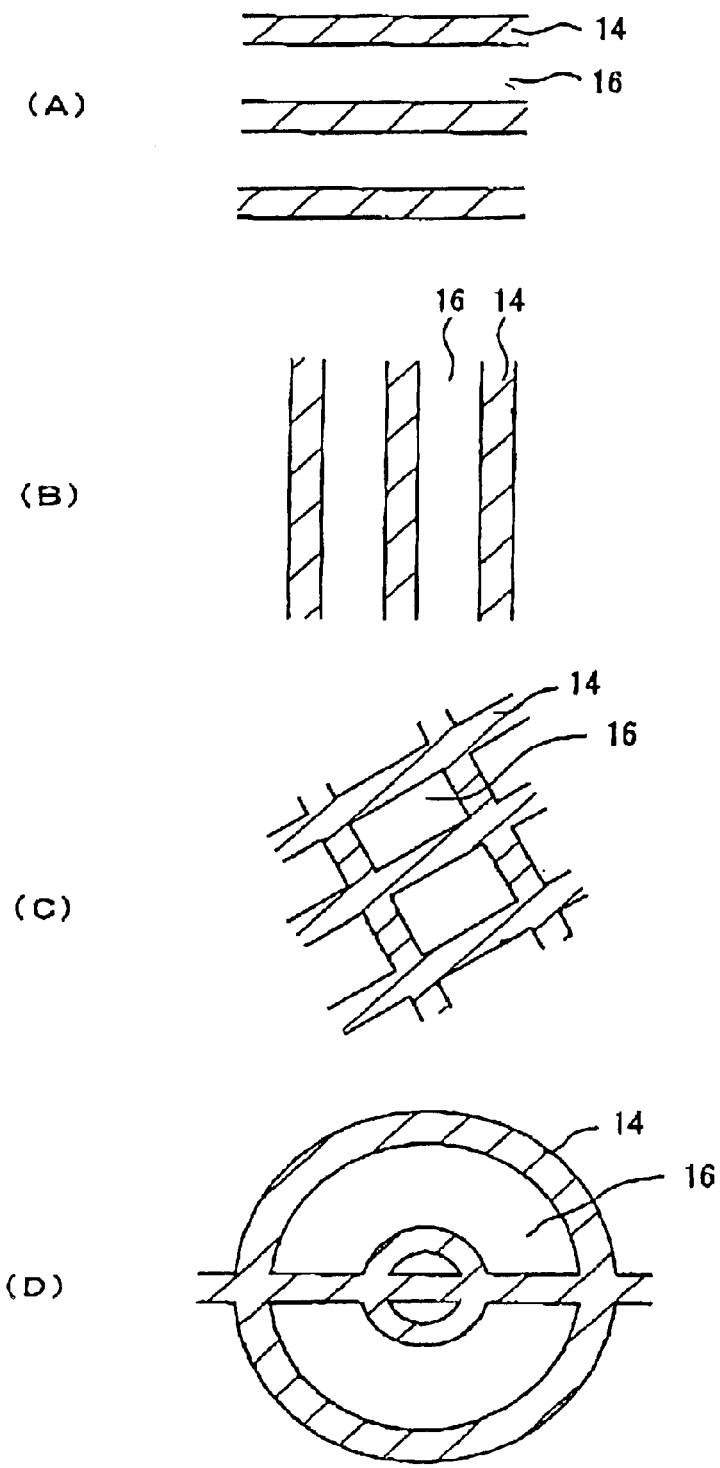
FIG. 3A to FIG. 3D are plane views of anti-static layers that are formed in patterns.

Other specific examples of planar patterns that may be used for the anti-static layer 14 are shown in FIGS. 3A to 3D. By forming a pattern of horizontal or vertical stripes as shown in FIGS. 3A and 3B, the surface area of the anti-static layer 14 can be reduced by a certain amount with a preset anti-static effect being maintained. When this kind of pattern is used, it is easy to align the pattern with the scan lines of a LCD apparatus, for example, so that the displayed images can be made clearer to the viewer.

When a lattice (diamond) pattern is formed as shown in FIG. 3C, there is the advantage that a ground connection can be easily made at the ends.

When a concentric pattern is combined with a horizontal stripe pattern as shown in FIG. 3D, images displayed on an LCD apparatus or the like can be made clearer than when a pattern of horizontal stripes is used, even for the case when the apparatus is viewed from a preset viewing angle.

(6) Surface Resistivity

It is also preferable for the surface resistivity (surface resistance) of the anti-static layer to be in a range of about $1 \times 10^4$ to $1 \times 10^{10}$ Ω·cm.

When the surface resistivity of the anti-static layer is below $1 \times 10^4$ Ω·cm, there are cases where a large amount of anti-static particles have to be added, so that many anti-static particles are overlapping, thereby causing a significant drop in a total light transmission.

On the other hand, when the surface resistivity of the anti-static layer is above about $1 \times 10^{10}$ Ω·cm, there are cases where there is a drop in the anti-static effect, so that it becomes difficult to effectively prevent dust and the like from adhering to the screen of a normal LCD apparatus or the like.

Accordingly, to achieve a more favorable balance between the total light transmission and the anti-static effect, it is more preferable for the surface resistivity of the anti-static layer 14 to be in a range of about $5 \times 10^4$ to $5 \times 10^9$ Ω·cm.

On the other hand, when an LCD apparatus uses an IPS LCD driving method, it is preferable for the surface resistivity of the anti-static layer 14 to fall in a range of about $1 \times 10^4$ to $5 \times 10^8$ Ω·cm.

When the surface resistivity of the anti-static layer 14 is above about $5 \times 10^8$ Ω·cm, there are cases where the driving of the LCD in the horizontal direction is impeded.

Accordingly, when an LCD apparatus uses an IPS LCD driving method, it is more preferable for the surface resistivity of the anti-static layer to be in a range of about $5 \times 10^4$ to $3 \times 10^8$ Ω·cm, with it being even more preferable for the surface resistivity to be in a range of about $1 \times 10^5$ to $1 \times 10^8$ Ω·cm.

4. Characteristics of the Hard Coat Film (1) Taber Abrasion Resistance

The present invention is characterized by using materials and processing such that the Taber abrasion resistance, as measured in accordance with JIS K5400, of the anti-static hard coat film is 25 or below.

When the Taber abrasion resistance exceeds 25, there is a noticeable drop in the resistance to scratch.

Accordingly, in order to improve the resistance to scratch and the anti-static effect, it is more preferable to use materials and processes such as to achieve a Taber abrasion resistance of the anti-static hard coat film at a value of 22 or below.

It should be noted that the Taber abrasion resistance of the anti-static hard coat film can be measured according to the method given in Example 1 later in this specification.

(2) Total Light Transmission

It is preferable to set the total light transmission of the anti-static hard coat film at a value in a range of about 80 to 99%.

When the total light transmission is below about 80%, there are cases where there is a drop in the viewability of displayed images due to the anti-static hard coat film. On the other hand, when the total light transmission exceeds about 99%, there are cases where there is a relative drop in the anti-static characteristics and/or in the resistance to scratch.

Accordingly, to achieve a more favorable balance between the viewability of the anti-static hard coat film and the anti-static characteristics, it is more preferable to set the total light transmission of the anti-static hard coat film in a range of about 83 to 98%.

It should be noted that the total light transmission of the anti-static hard coat film can be measured according to the method given in Example 1 later in this specification.

(3) Haze Value

It is preferable to set the Haze value of the anti-static hard coat film in a range of about 0.1 to 5%.

When the Haze value is below 0.1%, there are cases where the amount of anti-static particles that can be added is excessively restricted, so that a sufficient anti-static effect cannot be achieved. On the other hand, when the Haze value exceeds 5%, there are cases where there is a relative drop in the light transmittance, resulting in a drop in the viewability of displayed images.

Accordingly, to achieve a more favorable balance between the anti-static effect and the light transmittance, it is more preferable to set the Haze value in a range of about 0.1 to 4%.

It should be noted that the Haze value can be measured according to the method given in Example 1 later in this specification.

Second Embodiment

The second embodiment of the present invention is a method of manufacturing an anti-static hard coat film that is characterized by including the first process and the second process given below.

First Process: A process in which a hard coat layer of ionizing radiation-curable resin is formed on a base film through irradiation with ionizing radiation.

Second Process: a second process that (i) forms an anti-static layer, which is about 0.03 to 2 μm thick and is composed of ionizing radiation-curable resin that includes anti-static particles with an average particle diameter of about 0.01 to 2 μm, on the hard coat layer and (ii) sets the Taber abrasion resistance (measured in accordance with JIS K5400) of the hard coat film at 25 or below.

1. First Process (1) Process Preparing a Hard Coat Agent

First, the various materials are evenly mixed to prepare a hard coat agent for forming the hard coat layer.

As described below, it is preferable for this hard coat agent to be prepared by evenly mixing (A) a main material that is an ionizing radiation-curable resin, (B) a curing agent (including a curing catalyst) for the ionizing radiation-curable resin, and (C) a solvent.

(i) (A) Component

This has the same content as the ionizing radiation-curable resin (transparent resin) of the component (A) described in the first embodiment.

(ii) (B) Component

This has the same content as the curing agent of the component (B) described in the first embodiment.

(iii) (C) Component

As examples, any of the following substances may be used as the solvent that constitutes the (C) component: methyl alcohol; ethyl-alcohol; n-propyl alcohol; isopropyl alcohol; n-butyl alcohol; isobutyl alcohol; pentyl alcohol; ethyl cellosolve; benzene; toluene; xylene; ethyl benzene; cyclohexane; ethyl cyclohexane; ethyl acetate; butyl acetate; methyl ethyl ketone; methyl isobutyl ketone; cyclohexanone; tetrahydrofuran; and water. Alternatively, a combination of two or more of such solvents may be used.

It is especially preferable to use an alcohol, such as a methyl alcohol, an ethyl alcohol, an n-propyl alcohol, an isopropyl alcohol, an n-butyl alcohol, an isobutyl alcohol, or a pentyl alcohol, since the ionizing radiation-curable resin, which is an acrylic monomer or the like, can be easily dissolved.

(iv) Other Materials

Conventionally known additives, such as an anti-foaming agent and a leveling agent, can be added to the hard coat agent as desired.

(2) Process Applying the Hard Coat Agent

Figure 4:
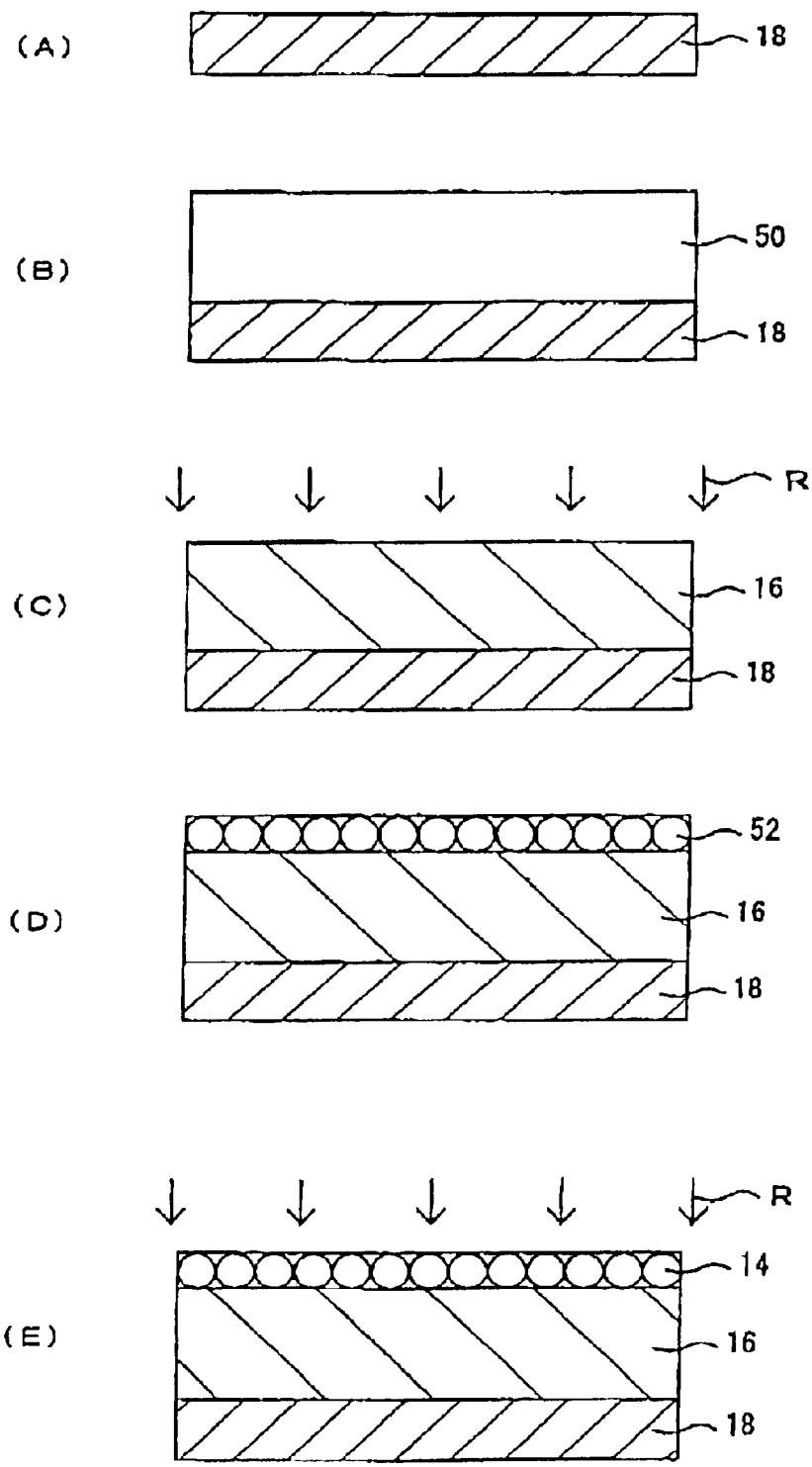
FIG. 4A to FIG. 4E show one example of the manufacturing of an anti-static hard coat film according to the present invention.

After this, as shown in FIGS. 4A and 4B, a base film 18 is prepared and the hard coat agent 50 that has been prepared in Process (1) is applied on the base film 18 so that the thickness after curing is in a range of about 2 to 20 μm, and preferably in a range of about 5 to 15 μm.

The thickness of the applied layer can be controlled by calculating the amount of hard coat agent that needs to be applied from the concentration of solids in the hard coat agent and the density of the hard coat layer after curing.

It should be noted that there are no particular restrictions on the method for applying the hard coat agent, so that a well-known method, such as a bar coating method, a knife coating method, a roll coating method, a blade coating method, and a die coating method, may be used.

(3) Curing Process

Next, as shown by FIG. 4C, according to the present invention it is preferable to cure the applied (ionizing radiation-curable resin) layer 50 of the hard coat agent (from which the solvent has first been evaporated by a heating process) by irradiating the applied layer 50 with ionizing radiation R, such as UV rays or microwaves, to form a semi-cured hard coat layer 16.

In more detail, if the present method is used, the ionizing radiation-curable resin of the hard coat layer and the ionizing radiation-curable resin of the anti-static layer can be made to react at the interface of the hard coat layer and the anti-static layer when the anti-static layer is cured and formed. Accordingly, the mechanical strength of the anti-static layer can be increased, and a preset resistance to scratch can be effectively achieved.

Also, if the present method is used, even if oxygen in the periphery impedes the reaction when the anti-static layer is cured, the anti-static layer can still be sufficiently cured by making effective use of an initiator that remains in the hard coat layer.

It is also preferable for the amount of radiation, such as UV light, that is used to irradiate the ionizing radiation-curable resin when forming the semi-cured hard coat layer to be below about 100 mJ/cm$^2$.

When the amount of UV radiation is equal to or above about 100 mJ/cm$^2$, there can be cases where the curing of the hard coat layer proceeds too quickly, making it difficult for the ionizing radiation-curable resin in the hard coat layer and the ionizing radiation-curable resin in the anti-static layer to react at the interface between the hard coat layer and the anti-static layer.

However, if no curing is performed for the hard coat layer, there are cases where it is difficult to laminate the ionizing radiation-curable resin for forming the anti-static layer with an even thickness and where the hard coat layer shrinks excessively during the curing in the following process.

Accordingly, it is more preferable for the amount of UV radiation used when forming a semi-cured hard coat layer to fall in a range of about 50 to 90 mJ/cm$^2$, with an amount in a range of about 60 to 80 mJ/cm$^2$ being even more preferable.

It should be noted that when a semi-cured hard coat layer is formed, there are no particular restrictions on the irradiating apparatus (UV irradiation apparatus) that can be used, so that a UV irradiation apparatus such as a high pressure mercury lamp, a xenon lamp, a metal halide lamp, or a Fusion H lamp, or a microwave irradiating apparatus may be used.

2. Second Process (1) Preparation Process for the Anti-Static Agent

It is preferable to prepare the anti-static agent by evenly mixing (a) a main material that is an ionizing radiation-curable resin (a transparent curable resin), (b) a curing agent (including a curable catalyst) for the ionizing radiation-curable resin, (c) a solvent, and (d) anti-static particles.

(2) Process Applying the Anti-Static Agent

Next, as shown in FIG. 4D, the anti-static agent 52 that has been prepared is applied onto the semi-cured hard coat layer 16 in the same way as the hard coat agent is applied, using, for example, any of a bar coating method, a knife coating method, a roll coating method, a blade coating method, and a die coating method.

(3) Curing Process 1

Next, as shown in FIG. 4E, it is preferable to perform irradiation with the ionizing radiation R, so that the final curing of the semi-cured hard coat layer 16 proceeds together with the curing of the layer 52 and thus the formation of the anti-static layer 14.

In more detail, the amount of irradiating UV light that is used when forming the cured hard coat layer and the anti-static layer strongly affects the Taber abrasion resistance and the surface resistance of the anti-static hard coat film. For this reason, in order to obtain a superior Taber abrasion resistance, such as a Taber abrasion resistance of 25 or below, it is effective to set the amount of irradiating UV light at about 500 mJ/cm$^2$ or above.

(4) Curing Process 2

Figure 5:
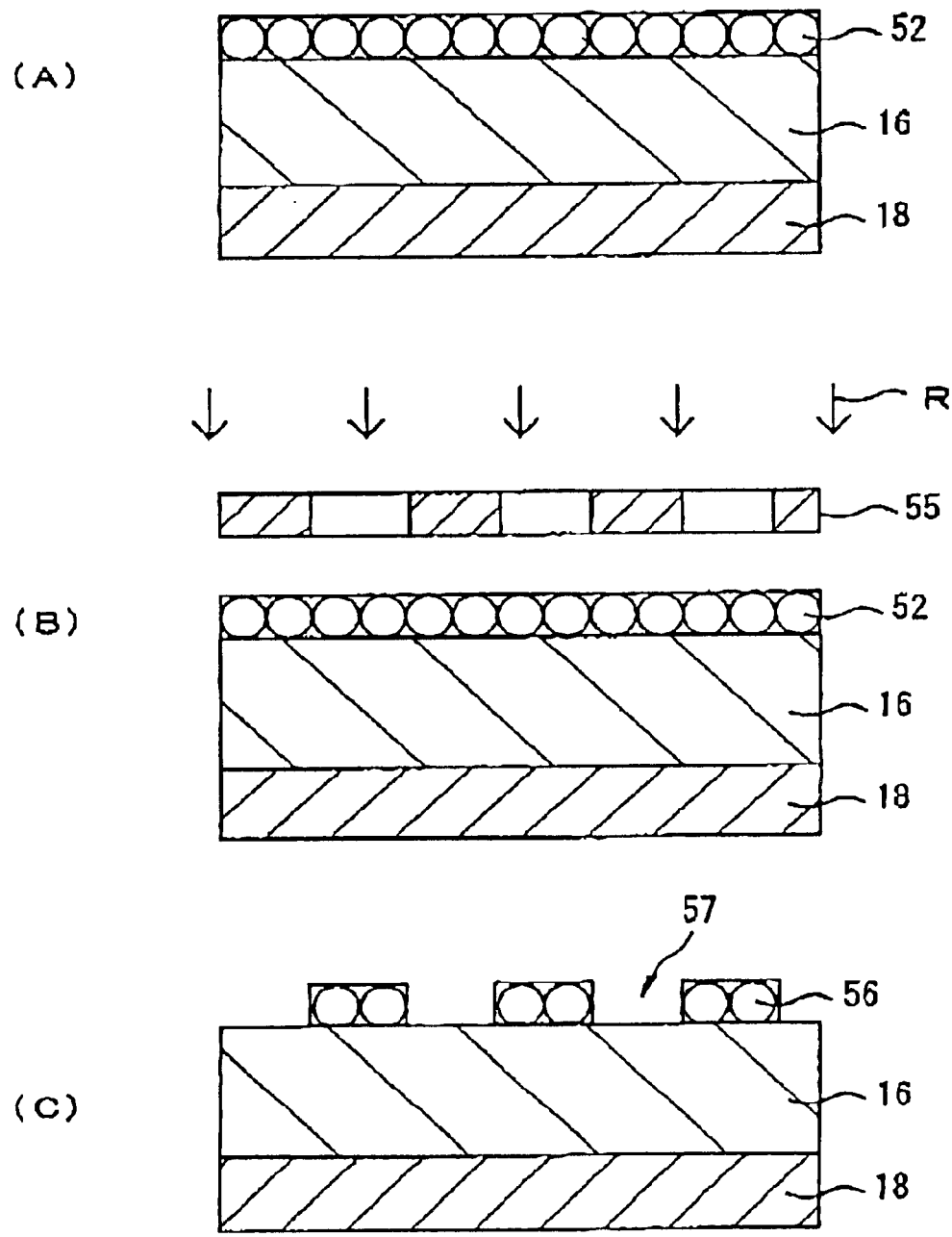
FIG. 5A to FIG. 5C show one example of the manufacturing of an anti-static hard coat film that has an anti-static layer formed in a pattern according to the present invention.
Figure 6:
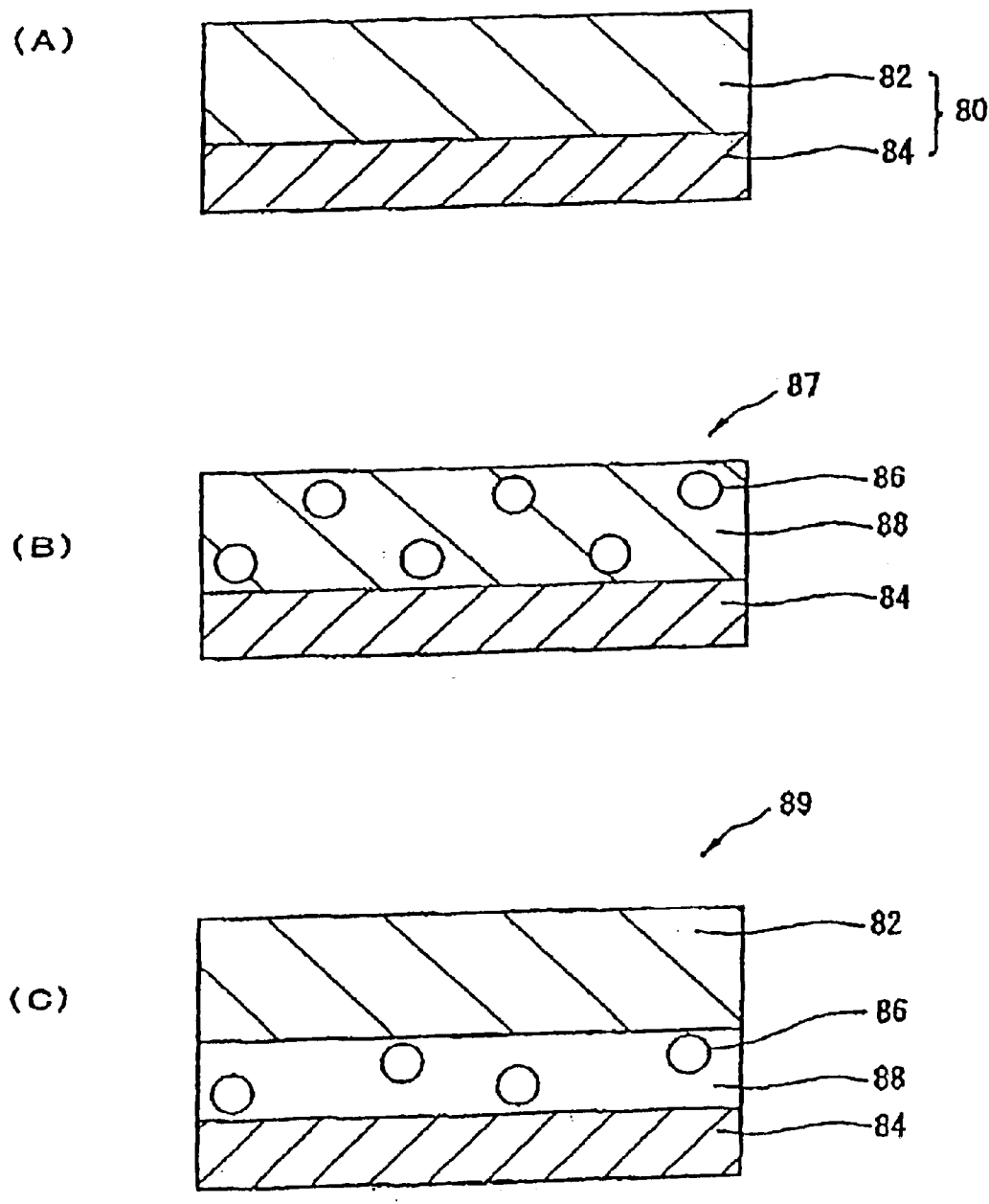
FIG. 6A to 6C are diagrams that are used to describe the conventional anti-static hard coat films.
Figure 7:
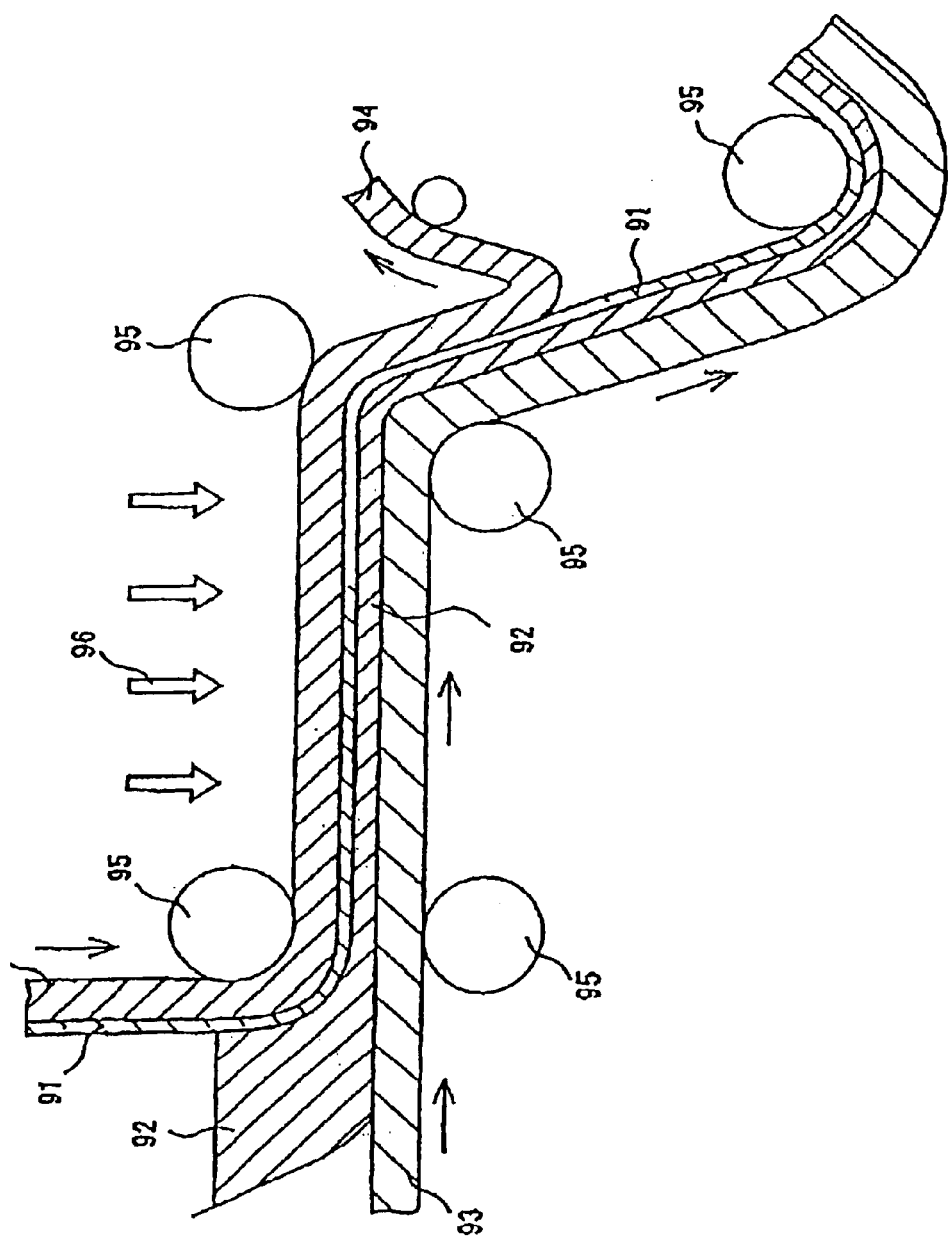
FIG. 7 is a diagram that is used to describe a conventional method of manufacturing an anti-static hard coat film.

When curing the ionizing radiation-curable resin, as shown in FIG. 5A it is preferable to prepare a semi-cured hard coat layer 16 and a pre-curing anti-static layer 52, and then perform irradiation with the ionizing radiation R via a photo mask 55 as shown in FIG. 5B.

When the above operation is performed, as shown in FIG. 5C it is extremely easy to form an anti-static layer 56 in a desired pattern.

However, there are cases where the semi-cured hard coat layer 16 cannot be sufficiently cured when the irradiation with the ionizing radiation R is performed via the photo mask 55. As a result, though not shown in the drawings, it is preferable for irradiation with the ionizing radiation R to be repeated after the state shown in FIG. 5C.

EXAMPLES

The following describes the present invention in more detail with reference to several examples of anti-static hard coat films. It should be obvious that these examples are mere representations of the present invention, so that the scope of the present invention is in no way limited to the content of these examples.

Example 1

1. Manufacturing the Anti-Static Hard Coat Film
(1) Preparing the Hard Coat-Forming Application Agent The ingredients of the hard coat-forming application agent were placed with the proportions given below into a vessel equipped with an agitator and were evenly mixed using the agitator to prepare a hard coat-forming application agent with a 50% concentration of solids.

UV-curing acrylic hard coat agent including curing agent Seikabeam EXF01L(NS) (made by DAINICHISEIKA COLOR & CHEMICALS MFG. CO., LTD)

| (100% concentration of solids) | 100 pbw |
|---|---|
| Isobutyl alcohol | 100 pbw |

(2) Formation of a Semi-Cured Hard Coat Layer

The obtained hard coat-forming application agent was applied, using a bar coater, onto a 50 μm-thick polyethylene terephthalate film that is used as the base film. Here, the hard coat-forming application agent was applied so that the thickness after curing is 5 μm. After this, the applied layer composed of the hard coat-forming application agent was dried in an oven for one minute at 80° C.

Next, the applied layer composed of the hard coat-forming application agent was irradiated with 80 mJ/cm$^2$ of radiation using a UB042-5AM/w UV irradiating apparatus (made by EYE GRAPHICS CO., LTD) to produce a semi-cured hard coat layer.

(3) Formation of the Anti-Static Layer

The ingredients of the anti-static layer-forming application agent were placed with the proportions given below into a vessel equipped with an agitator and were evenly mixed using the agitator to prepare an anti-static layer-forming application agent with a 3% concentration of solids.

A UV-curing acrylic hard coat agent including curing agent Seikabeam EXF01L(NS) (made by DAINICHISEIKA COLOR & CHEMICALS MFG. CO., LTD)

(100% concentration of solids) 100 pbw

An SN-100P dispersed solution of antimony-doped tin oxide (with a particle diameter of 0.1 μm) in isobutyl alcohol (made by ISHIHARA TECHNO CORP.)

| (30% concentration of solids) | 1000 pbw |
|---|---|
| Isobutyl alcohol | 12233 pbw |

After this, anti-static layer-forming application agent was applied using a bar coater and the obtained applied layer was dried in an oven for one minute at 80° C.

Next, the applied layer was irradiated with UV light using a UV light irradiating apparatus so that the amount of radiation was 700 mJ/cm$^2$. As the curing of the semi-cured hard coat layer proceeded, the layer applied to form the anti-static layer cured to form the anti-static layer.

In this way, the anti-static hard coat film was manufactured with the thickness of the hard coat layer at 5 μm and the thickness of the anti-static layer at 0.1 μm.

2. Evaluation of the Anti-Static Hard Coat Film
(1) Resistance to Scratch (Taber Abrasion Resistance)

The Taber abrasion resistance of the obtained anti-static hard coat film was measured in accordance with JIS K5400.

In more detail, an abrasion resistance test was performed according to the following conditions, the difference in the Haze values (measured according to JIS K6714 Standard) before and after the abrasion resistance test was found, and was set as the Taber abrasion resistance.

| Abrasion wheel | CS-10F |
|---|---|
| Weight | 250 g |
| Number of revolutions | 100 |

(2) Surface Resistivity

The surface resistivity of the obtained anti-static hard coat film was measured using parallel electrodes that were connected to a digital electrometer manufactured by ADVANTEST CORP.

(3) Total Light Transmission

The total light transmission by the obtained anti-static hard coat film was measured in accordance with JIS K6714 Standard using a Haze meter manufactured by NIPPON DENSHOKU KOGYO CO., LTD.

(4) Initial Haze Value

The Haze value of the obtained anti-static hard coat film was measured in accordance with JIS K6714 Standard using a Haze meter manufactured by NIPPON DENSHOKU KOGYO CO., LTD. as the initial Haze value.

(5) Steel Wool Hardness

The surface of the obtained anti-static hard coat film was rubbed with #0000 steel wool, the appearance was visually examined, and the steel wool hardness was assessed as follows.

○: No prominent changes in the external appearance were observed x: Scratching and/or discoloring was/were observed Examples 2 to 4 and Comparative Examples 1 and 2

Similar anti-static hard coat films to Example 1 were manufactured by varying the thickness of the anti-static layer and the amount of UV radiation used in the first process as shown in Table 1, with these anti-static hard coat films then being assessed. The obtained results are also shown in Table 1.

TABLE 1

|  | Example 1 | Example 2 | Example 3 | Example 4 | Comparative Example 1 | Comparative Example 2 |
|---|---|---|---|---|---|---|
| First process: irradiated amount of UV rays (mJ/cm$^2$) | 80 | 80 | 80 | 80 | 80 | 120 |
| Second process: irradiated amount of UV rays (mJ/cm$^2$) | 700 | 500 | 700 | 700 | 700 | 700 |
| Thickness of the anti-static layer ($\mu$m) | 0.1 | 0.1 | 1 | 0.03 | 3 | 0.1 |
| Taber abrasion resistance (–) | 3.5 | 14.8 | 2.9 | 22.0 | 7.1 | >25 |
| Surface resistivity ($\Omega$/cm) | $1.2 \times 10^8$ | $3.2 \times 10^9$ | $3.3 \times 10^8$ | $4.2 \times 10^8$ | $1.4 \times 10^7$ | $4.6 \times 10^9$ |
| Total light transmission (%) | 88.2 | 87.8 | 85.9 | 90.8 | 78.5 | 88.0 |
| Initial Haze value (%) | 1.2 | 1.4 | 0.8 | 3.1 | 1.2 | 1.4 |
| Steel wool hardness | ○ | ○ | ○ | ○ | ○ | x |

With the anti-static hard coat film according to the present invention, a superior anti-static effect can be obtained, with superior viewability and resistance to scratch also being obtained.

Accordingly, the present anti-static hard coat film is ideal for use as a hard coat film for an LCD apparatus or an IPS LCD apparatus, or for use as a protective film in other kinds of display apparatus.

According to the method of manufacturing an anti-static hard coat film according to the present invention, a hard coat film that has a superior anti-static effect, as well as superior viewability and resistance to scratch can be manufactured efficiently.

What is claimed is:

1. An anti-static hard coat film, comprising:
   a base film;
   a hard coat layer, which comprises an ionizing radiation-curable resin, and which is obtained by ionizing radiation curing of about 100 mJ/cm$^2$ or below; and
   an anti-static layer, which is about 0.03 to 2 $\mu$m thick and which comprises an ionizing radiation-curable resin that includes anti-static particles with an average particle diameter of about 0.01 to 2 $\mu$m, and which is obtained by ionizing radiation curing of about 500 mJ/cm$^2$ or above;
   wherein the hard coat layer and the anti-static layer are disposed in order on the base film, and the anti-static hard coat film has a Taber abrasion resistance of 25 or below as measured in accordance with JIS (Japanese Industrial Standards) K5400.

2. The anti-static hard coat film in accordance with claim 1, wherein a thickness of the anti-static layer is substantially equal to the average particle diameter of the anti-static particles.

3. The anti-static hard coat film in accordance with claim 1, wherein an added amount of the anti-static particles falls in a range of about 50 to 90% by weight relative to a total weight of the anti-static layer.

4. The anti-static hard coat film in accordance with claim 1, wherein the anti-static layer is formed in a pattern.

5. The anti-static hard coat film in accordance with claim 1, wherein the ionizing radiation-curable resin in the hard coat layer and the ionizing radiation-curable resin in the anti-static layer react at an interface between the hard coat layer and the anti-static layer.

6. The anti-static hard coat film in accordance with claim 1, wherein the hard coat layer is an anti-glare hard coat layer.

7. The anti-static hard coat film in accordance with claim 1 wherein the anti-static hard coat film is a surface member of an IPS (In-Plane Switching) liquid crystal display apparatus.

8. An IPS (In-Plane Switching) liquid crystal display apparatus having at least one surface on which is disposed an antistatic hard coat film as claimed in claim 1.

9. A method of manufacturing an anti-static hard coat film, comprising:
   a first step of forming a hard coat layer, composed of an ionizing radiation-curable resin, on a base film by irradiating the ionizing radiation-curable resin with ionizing radiation of about 100 mJ/cm$^2$ or below; and
   a second step of forming an anti-static layer, which is about 0.03 to 2 $\mu$m thick and is made of an ionizing radiation-curable resin that includes anti-static particles with an average particle diameter of about 0.01 to 2 μm, by ionizing radiation curing of about 500 mJ/cm² or above, on top of the hard coat layer; and setting a Taber abrasion resistance of the anti-static hard coat film at 25 or below as measured in accordance with JIS (Japanese Industrial Standards) K5400.

10. The method of manufacturing an anti-static hard coat film according to claim 9, wherein during the first step, the hard coat layer is-formed in a semi-cured state by irradiation with ionizing radiation, and, during the-second step the anti-static layer is cured by irradiation with ionizing radiation, and the hard coat layer is also further cured.

11. The method of manufacturing an anti-static hard coat film according to claim 9, wherein the second step is performed in a nitrogen atmosphere.

12. The method of manufacturing an anti-static hard coat film according to claim 9, wherein further comprising irradiating said anti-static layer in a pattern.

* * * * *